United States Patent [19]

Muto

[11] Patent Number: 4,807,027
[45] Date of Patent: Feb. 21, 1989

[54] STATION PLATFORM OBSERVATION METHOD

[75] Inventor: Takao Muto, Hyogo, Japan

[73] Assignee: Mitsubishi Denki Kabushiki Kaisha, Tokyo, Japan

[21] Appl. No.: 143,235

[22] Filed: Jan. 7, 1988

Related U.S. Application Data

[63] Continuation of Ser. No. 832,625, Feb. 25, 1986, abandoned.

[30] Foreign Application Priority Data

Feb. 27, 1985 [JP] Japan .................................. 60-40351

[51] Int. Cl.$^4$ .............................................. H04N 7/18
[52] U.S. Cl. .................................... 358/108; 358/105
[58] Field of Search ............... 358/108, 105, 109, 125, 358/126; 246/167 R, 125; 104/27, 28; 105/341; 340/571

[56] References Cited

U.S. PATENT DOCUMENTS

| | | | |
|---|---|---|---|
| 2,956,117 | 10/1980 | Ernst et al. ........................... | 358/108 |
| 4,198,653 | 4/1980 | Kamin .................................. | 358/105 |
| 4,249,207 | 2/1981 | Harman et al. ...................... | 358/108 |
| 4,337,481 | 6/1982 | Milk et al. ........................ | 358/108 X |
| 4,348,274 | 8/1982 | Bambara ............................. | 358/108 |
| 4,418,224 | 10/1983 | Yoshida .......................... | 358/105 X |
| 4,458,260 | 7/1984 | Mahoney ............................. | 358/105 |
| 4,679,077 | 7/1987 | Yuasa et al. .................... | 358/105 X |

FOREIGN PATENT DOCUMENTS

| | | | |
|---|---|---|---|
| 1279451 | 6/1972 | Australia ............................. | 358/108 |
| 1942743 | 4/1970 | Fed. Rep. of Germany ...... | 358/108 |
| 0105389 | 6/1985 | Japan .................................... | 358/93 |

OTHER PUBLICATIONS

*METRO '77 Owner's Manual*, prepared by The Office of Marketing, Washington Metropolitan Area Transit Authority, pp. 14 & 15.
"Continuous Control is Metro's Goal", *The Professional Journal of Business Communications*, Oct. '76, p. 28.

Primary Examiner—Howard W. Britton
Assistant Examiner—Victor R. Kostak
Attorney, Agent, or Firm—Sughrue, Mion, Zinn, Macpeak and Seas

[57] ABSTRACT

A train platform observation method in which the platform is continuously observed by a television camera and the output of the camera is displayed on a television monitor. First scene data outputted by the camera is compared with later-outputted second scene data, and variations therebetween are detected. When the level of the detected variations exceed a predetermined level, an indication is given to the operator that a dangerous condition exists and a signal is produced which prevents the train from departing the platform. An indication may also be produced on the monitor to indicate to the operator where the dangerous condition is present.

2 Claims, 3 Drawing Sheets

STATION PLATFORM OBSERVATION METHOD

This is a continuation of application Ser. No. 832,625 filed Feb. 25, 1986, now abandoned.

BACKGROUND OF THE INVENTION

The present invention relates to a railway station platform observation method whereby passengers on the platform of a railway station are observed to protect them from danger and injury.

In general, in railway transportation, a number of doors of a multi-car train are simultaneously opened or closed. Each of the doors of the train generally has a device for detecting when a passenger is caught in a door. That is, when a passenger is caught in a door, the door is opened or the train starting circuit is deenergized to prevent injury to the passenger.

However, such devices are limited in detection sensitivity. Specifically, conventional devices often cannot detect when a part of a passenger's clothing, handbag, umbrella or the like is caught in a door. Accordingly, in this case, a considerably dangerous condition may occur whereby the passenger is dragged by the train.

In order to prevent the occurrence of such a dangerous condition, station employees and the conductor must personally observe the situation so that the doors of the train are opened and closed under the condition that the passengers are protected from danger at all times.

In a station where it is difficult for a single station employee or the conductor to observe the whole train such as one where the track is curved, it is necessary to employ a passenger observation system, an example of which is shown in FIG. 1. In FIG. 1, reference numeral 1 designates an object such as a passenger who is moving; 2, a television camera positioned so as to be able to photograph the platform and the train; and 3, a television monitor connected to the television camera 2, the monitor 3 being installed at a predetermined position in the station office or in a central control room.

With this system, in response to a departure signal, the conductor directly observes the platform and the train as far as he can, observes the dead angle area where his vision is blocked through the monitor 3, and closes the doors only after confirming the safety of the passengers. On the other hand, one or more station employees on the platform directly or through the television monitor also check for the safety of the passengers, and further a controller in the central control room may check for the safety of the passengers through observing the monitor.

In the conventional method of observing a train at a platform as described above, the persons concerned with the passengers' safety must watch the screen of the monitor 3 for long periods at a time, which is tiring. In addition, there is a time delay between the detection of a dangerous condition and the issuance of an instruction to avoid the danger.

SUMMARY OF THE INVENTION

An object of the invention, therefore, is to eliminate the above-described difficulties. More specifically, an object of the invention is to provide a method of observing a train at a platform in which continuous, fatigue-inducing observation of a monitor is not required, and in which, when a dangerous condition occurs, action can be quickly taken to prevent injury or damage.

In a method of observing a train at a station platform according to the invention, variations between platform scenes at predetermined time intervals are detected, and when a scenery variation occurs in predetermined areas, an alarm signal and a signal for stopping the train are produced.

In a passenger observation system of the invention, a changed-scene point on a station platform is displayed on the screen of the monitor so that those responsible for passenger safety can quickly be informed of dangerous conditions so that they can quickly carry out necessary actions for preventing injury or damage, such as by preventing the departure of the train.

DESCRIPTION OF THE PREFERRED EMBODIMENTS

Figure 1:
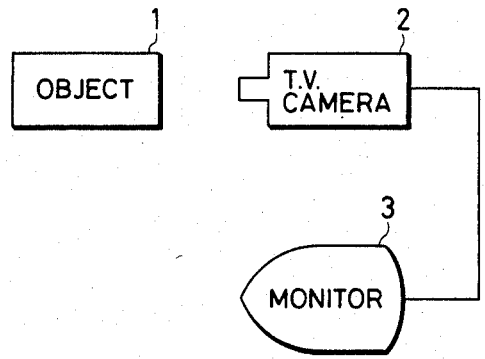
FIG. 1 is a block diagram showing a conventional passenger observation system.
Figure 2:
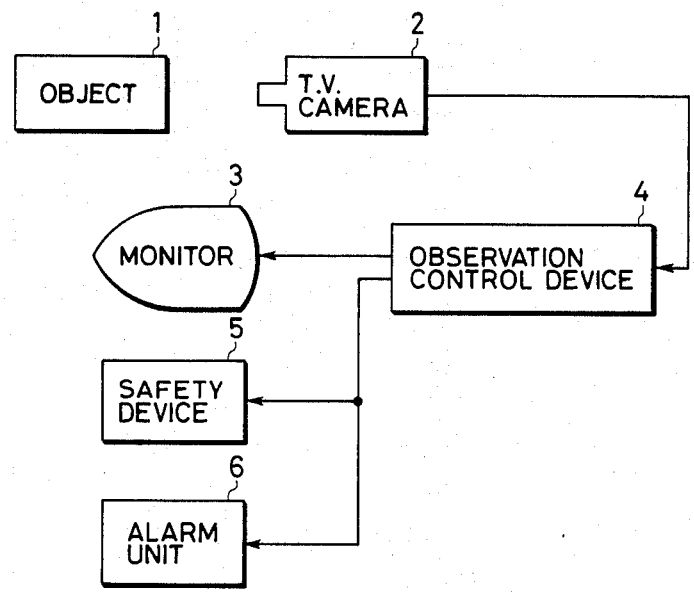
FIG. 2 is a block diagram illustrating a first embodiment of the invention.

A first preferred embodiment of the invention will be described with reference to FIGS. 2 through 4. In FIG. 2, reference numerals 1, 2 and 3 designate an object, a television camera, and a television monitor, respectively, which are the same as those used in the conventional passenger observation system. Further in FIG. 2, reference numeral 4 designates an observation control device (described later in detail) which outputs as processed data photographic data delivered thereto from the television camera 2; 5, a safety device which, when passengers are in danger, cause emergency brakes or the like to operate to stop the train; and 6, an alarm device which, when there is a dangerous condition, provides a visual or aural indication of such condition.

Figure 3:
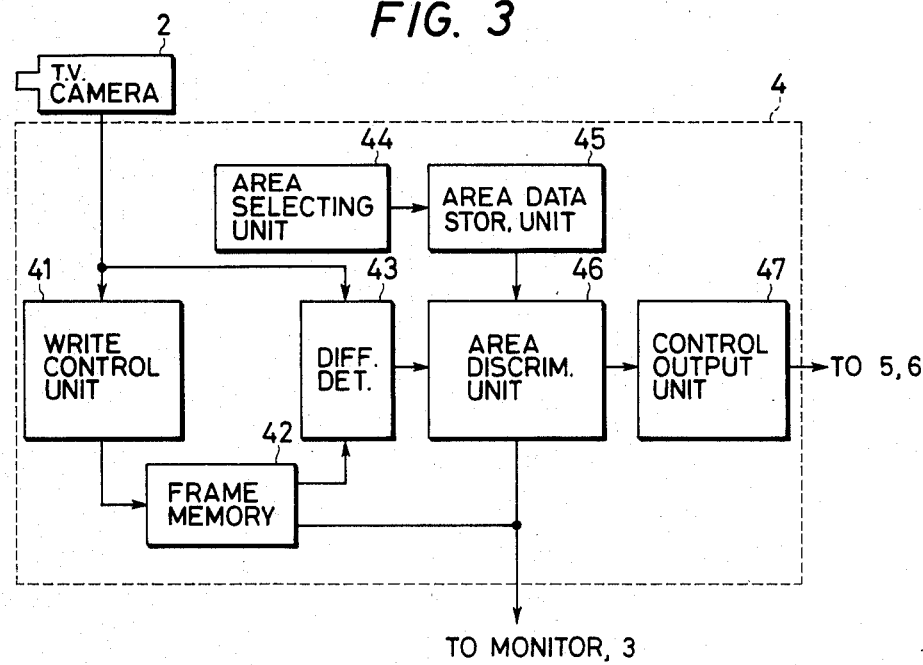
FIG. 3 is a block diagram showing an essential component of FIG. 2 in detail.

FIG. 3 shows the observation control device 4 in more detail. In FIG. 3, reference numeral 41 designates a write control unit for recording photographic date, i.e., scenery data supplied thereto from the television camera 2; 42, a frame memory unit for temporarily storing scenery data; 43, a difference detecting unit for detecting differences between the scenery data stored in the frame memory unit 42 and scenery data supplied directly from the television camera; 44, an area selecting unit for selecting an area which should be especially watched with respect to the scenery data; 45, an area data storing unit for storing area data selected by the area selecting section 44; 46, an area discriminating unit for discriminating scenery differences detected by the difference detecting section 43 with respect to the area data stored in the area data storing section; and 47, a control output section receiving outputs of the area discriminating section 46 and, in response, applying operating instructions to the safety device 5 and the alarm device 6.

Figure 4:
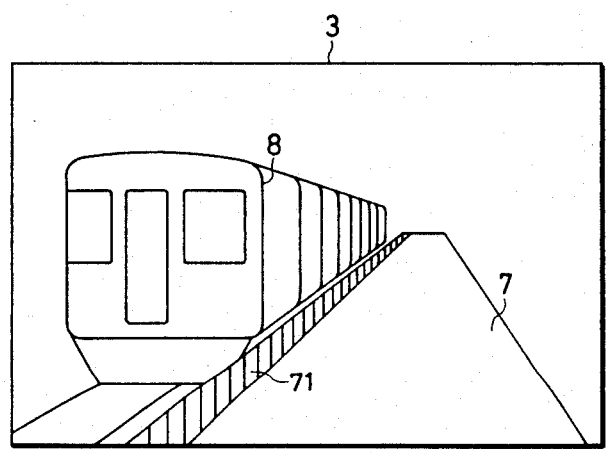
FIG. 4 is an explanatory diagram indicating a picture displayed using the first embodiment.

FIG. 4 shows an example of scenery data displayed on the monitor 3. In FIG. 4, reference numeral 7 designates a railway station platform; 71, an area on the platform which is to be watched with great care; and 8, a train stopped at the platform 7.

The operation of the passenger observation system thus constructed will be described. Images of the platform 7 and the train 8 from the television camera 2 are adjusted so that they are properly displayed on the monitor 3, and a dangerous area 71 of the platform 7 is determined in the displayed picture. Data indicative of the dangerous area 71 is inputted to the area selecting section 44 and is stored in the area storing section 45.

The television camera 2 produces a plurality of frames of scenery per unit period of time, and this scenery data is outputted at predetermined time intervals.

As the train 8 approaches the platform 7, the television camera 2 photographs the scene of the train's arrival, and the video output of the camera 2 is applied as scenery data to the observation control device 4. The device applies the scenery data to the write control unit 41 and the difference detecting unit 43. In the difference detecting unit 43, scenery data delivered from the television camera 2 and the frame memory section 42 are subjected to comparison to detect differences therebetween, and if any difference is detected, a predetermined difference-indicating signal is produced.

Scenery data supplied from the television camera 2 is in the form of frame data provided at determined time intervals, as described before. Therefore, in the frame memory section 42, scenery data previously delivered thereto is stored as first scenery data, and second scenery data is supplied thereto from the write control section 41 the predetermined time period after receipt of the first data.

The first scenery data and the scenery data delivered directly from the television camera 2 are supplied to the difference detecting section 43 where the two sets of data are compared for detecting differences therebetween. As is apparent from the above description, there is a time delay between the supply of the first and second scenery data to the difference detecting section 43, and the various frames of the scenery data are therefore successively detected.

If scenery data variations of the object 1 between the first and second scenery data are detected, this means that the object 1 is moving. Thus, the difference detecting section 43 detects a scenery variation and applies a scenery variation indicating signal to the area discriminating section 46. The area discriminating section 46 determines whether or not the scenery variation signal concerns the selected area 71 and whether or not the scenery variation is larger than a predetermined value, and applies to the monitor 3 the second scenery data in which the area 71 is specified. The data thus supplied is displayed on the monitor 3. If the scenery variation signal concerns the area 71, the area discriminating section 46 provides a predetermined signal to drive the control output section 47. As a result, the control output section 47 outputs signals for operating the safety device 5 and the alarm device 6 so that departure of the train 8 is prevented and the responsible persons are informed of the dangerous condition.

Figure 5:
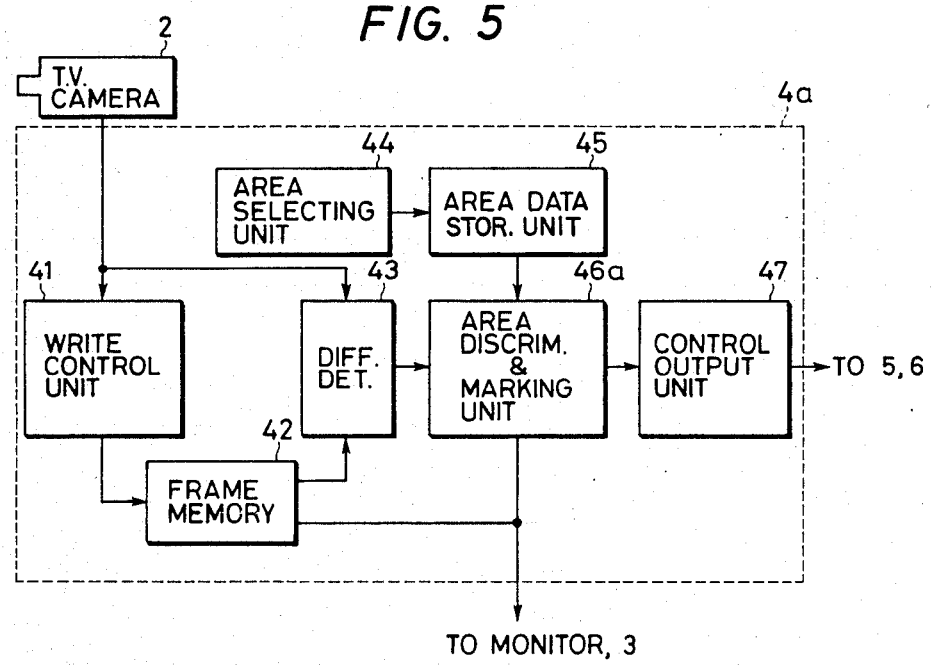
FIG. 5 is a block diagram illustrating a second embodiment of the invention.
Figure 6:
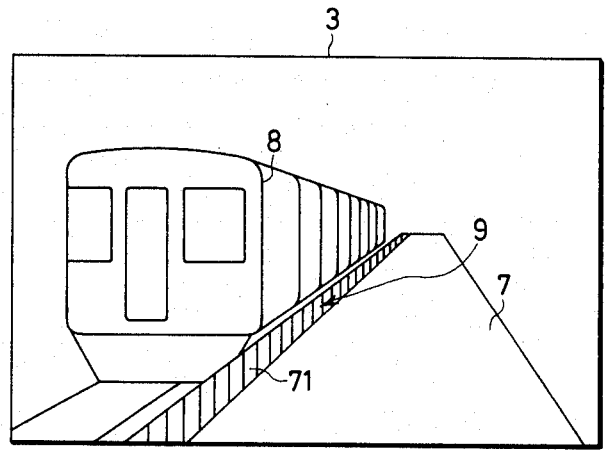
FIG. 6 is an explanatory diagram indicating a picture displayed using the second embodiment.

FIGS. 5 and 6 show a second preferred embodiment. An area discriminating and marking unit 46a subjects to comparison a signal representing scenery variations detected by the difference detecting section 43 and an area data signal stored by the area storing section 45. When the area discriminating section 46a determines that a scenery variation has occurred, the section 46a applies a signal representing a predetermined symbol which indicates the varied part, for instance, a signal representing a triangular mark, to the monitor 3. Accordingly, as shown in FIG. 6, a triangular mark 9 is displayed on the screen of the monitor 3. As in the first embodiment, the control output section 47 is simultaneously driven to operate the safety device 5 and the alarm device 6.

In the above-described embodiments, for the security of passengers at the departure of a train, it is detected whether or not there has occurred a scenery variation in a limited area. However, according to the above-described method, it can also be detected whether or not a passenger has fallen or intruded onto the tracks from the platform before the train arrives at the platform.

Further, the platform observation system of the invention can be installed at transportation facilities where positions for passengers to get on or off trains or buses are predetermined, such as monorail stations or surface car or bus stops. In these cases, the same effects as those described above can be obtained.

As is apparent from the above description, according to the invention, at the departure of a train, scenery variations are detected, and if a scenery variation occurs in a predetermined area and the variation becomes larger than a predetermined value with the lapse of time, a dangerous condition is detected and a signal for stopping the train produced. Therefore, at the departure of the train, the security of the passengers is ensured, and even if a dangerous condition occurs, an accident can be prevented.

I claim:

1. A station platform observation method in which a single television camera photographs the platform of a train station at which a train arrives and from which the train departs to produce scenery data of the platform and displays the scenery data on the screen of a television monitor, comprising:
    displaying first scenery data of the area between the platform and the train supplied by said television camera at the arrival and departure of said train on said monitor and storing said first scenery data in a memory for a predetermined period of time;
    comparing second scenery data supplied by said television camera later than said first scenery data with said first scenery data in a difference detection unit to detect differences between said first and second scenery data and provide a difference indicating signal;
    selecting a monitored area within said first scenery data and inputting area data indicative of the monitored area in an area storing unit;
    applying the difference indicating signal and said area data from said area storing unit to an area discriminating unit;
    determining whether the variation in scenery occurs within the monitored area and is greater than a predetermined value; and
    providing an indication to an operator that a dangerous condition exists and producing a signal for stopping said train.

2. A station platform observation method as set forth in claim 1, further comprising generating a signal in said area discriminating unit indicative of the location of the variation in scenery within said monitored area and applying said signal to said monitor to provide a mark on the screen of said monitor indicative of the location.

* * * * *